United States Patent

Asada

[11] Patent Number: 5,957,507
[45] Date of Patent: Sep. 28, 1999

[54] JOINT STRUCTURE FOR BRANCH CONNECTORS IN COMMON RAILS

[75] Inventor: Kikuo Asada, Mishima, Japan

[73] Assignee: Usui Kokusai Sangyo Kaisha Limited, Japan

[21] Appl. No.: 08/972,883

[22] Filed: Nov. 18, 1997

[51] Int. Cl.[6] .................................................. F16L 41/00
[52] U.S. Cl. ...................... 285/189; 285/197; 285/288.1; 285/289.1; 285/906
[58] Field of Search ................................. 285/197, 189, 285/288.1, 289.1, 906

[56] References Cited

U.S. PATENT DOCUMENTS

| | | | |
|---|---|---|---|
| 1,908,821 | 5/1933 | Cornell | 285/197 |
| 3,894,757 | 7/1975 | Best | 285/189 |
| 3,981,061 | 9/1976 | Jackson | 285/197 X |
| 4,103,940 | 8/1978 | Bills | 285/197 X |
| 4,179,141 | 12/1979 | Newman | 285/189 |
| 4,832,376 | 5/1989 | Sugao . | |
| 4,893,601 | 1/1990 | Sugao . | |
| 4,900,180 | 2/1990 | Takikawa . | |
| 5,120,084 | 6/1992 | Hashimoto . | |
| 5,143,410 | 9/1992 | Takikawa . | |
| 5,169,182 | 12/1992 | Hashimoto . | |
| 5,172,939 | 12/1992 | Takikawa . | |
| 5,261,705 | 11/1993 | Takahashi | 285/197 |
| 5,667,255 | 9/1997 | Kato . | |

FOREIGN PATENT DOCUMENTS

| | | | |
|---|---|---|---|
| 2359359 | 2/1978 | France | 285/197 |
| 2-80289 | 6/1990 | Japan . | |
| 3-177693 | 8/1991 | Japan . | |
| 4-175462 | 6/1992 | Japan . | |

*Primary Examiner*—Dave W. Arola
*Attorney, Agent, or Firm*—Anthony J. Casella; Gerald E. Hespos; Ludomir A. Budzyn

[57] ABSTRACT

A joint structure for a branch connector in a common rail, comprising: a main pipe rail having a conduit therein on its axis and a plurality of through holes formed in its circumferential wall at an axial spacing, each of the through holes having a pressure receiving seat formed on the circumferential face thereof and opened to the outside; a branch connector having a conduit to communicate with the conduit of the main pipe rail and including a joint head formed at the end thereof and forming a pressure seat so that the branch connector is engaged with the main pipe rail by bringing the pressure seat thereof into abutment against the pressure receiving seat of the main pipe rail; a joint fitting mounted on the main pipe rail; and a nut assembled in advance in the branch connector and fastened into the joint fitting against the pressure of the joint head thereby to joint the branch connector to the main pipe. The joint fitting is made of a cylindrical sleeve nipple having a threaded face so that the branch connector is jointed to the main pipe rail by jointing the base end of the sleeve nipple to the outer circumference of the main pipe rail in the vicinity of the pressure receiving face.

10 Claims, 4 Drawing Sheets

JOINT STRUCTURE FOR BRANCH CONNECTORS IN COMMON RAILS

BACKGROUND OF THE INVENTION

1. Field of the Invention

The present invention relates to a joint structure for a branch connector by a branch pipe or a branch fitting in a common rail such as a high-pressure fuel manifold or a block rail in a Diesel internal combustion engine.

2. Description of the Prior Art

In one of this kind of joint structure for a branch connector of the prior art, as shown in FIG. 7, a through hole 11-2 formed in the circumferential wall of a main pipe rail 11 and communicating with an internal conduit 11-1 is formed to have a pressure receiving seat 11-3 opened to the outside, and a ring-shaped joint fitting 13 enclosing the outer circumference of the main pipe rail 11 in the vicinity of the pressure receiving seat is used to bring a pressure seat 12-3, which is formed by a joint head 12-2 of a branch connector 12 tapered by the buckling method, into abutting engagement with the end portion of the pressure receiving seat 11-3, so that the branch pipe 12 is jointed to the main pipe rail 11 by fastening a male nut 14, which is assembled in advance in the branch connector 12, by the pressure below the neck of the joint head 12 into a threaded wall 13-1 protruded from the joint fitting. Here, reference numeral 15 designates a sleeve washer.

In this joint structure of the prior, however, the product weight at the connected portion is seriously increased by the use of the aforementioned ring-shaped joint fitting 13 thereby to raise a difficulty that the product weight cannot be reduced. Since the joint fitting is merely fitted on the main pipe rail 11, moreover, its positioning takes a long time, and the joint fitting may be brought out of position in the axial direction by vibrations or impacts. This out-of position invites a slackness to induce a leakage thereby to make the connection unstable. When the branch connector 12 is removed, moreover, another problem may arise in that the joint fitting 13 may move in the axial direction to allow the dust to steal from the outer surface of the main pipe rail 11 into the clearance between the main pipe rail 11 and the joint fitting 13.

SUMMARY OF THE INVENTION

The invention has been conceived in view of the aforementioned problems concomitant with the prior art and has an object to provide a joint structure for a branch connector in a common rail, which can be easily manufactured by using a sleeve nipple as the joint fitting in place of the ring-shaped joint fitting of the prior art and by adopting the welding or soldering method for the connection to the main pipe rail, to reduce the product weight, to solve the problem of the out-of position of the joint fitting, to eliminate the leakage or the dust steal, as might otherwise be caused at the connected portion for a long time, and to ensure a reliable, stable and easy connection.

In order to achieve the above-specified object, there is provided a joint structure for a branch connector in a common rail, comprising: a main pipe rail having a conduit therein on its axis and a plurality of through holes formed in its circumferential wall at an axial spacing, each of the through holes having a pressure receiving seat formed on the circumferential face thereof and opened to the outside; a branch connector having a conduit to communicate with the conduit of the main pipe rail and including a joint head formed at the end thereof and forming a pressure seat so that the branch connector is engaged with the main pipe rail by bringing the pressure seat thereof into abutment against the pressure receiving seat of the main pipe rail; a joint fitting mounted on the main pipe rail; and a nut assembled in advance in the branch connector and fastened into the joint fitting against the pressure of the joint head thereby to joint the branch connector to the main pipe, wherein the joint fitting is made of a cylindrical sleeve nipple having a threaded face so that the branch connector is jointed to the main pipe rail by jointing the base end of the sleeve nipple to the outer circumference of the main pipe rail in the vicinity of the pressure receiving face. In a joint structure for a branch connector in a common rail, moreover, a cap nut assembled in advance in the branch connector is fastened into the joint fitting against the pressure of the joint head thereby to joint the branch connector to the main pipe, wherein the joint fitting is made of a cylindrical sleeve nipple having a threaded face in its outer circumference so that the branch connector is jointed to the main pipe rail by jointing the base end of the sleeve nipple to the outer circumference of the main pipe rail in the vicinity of the pressure receiving face. Still moreover, each of the cylindrical sleeve nipple having the threaded face in its inner circumference and the cylindrical sleeve nipple having the threaded face in its outer circumference has a jointing flange at its base end. In addition, each of the cylindrical sleeve nipple having the threaded face in its inner circumference and the cylindrical sleeve nipple having the threaded face in its outer circumference is so connected at its base end to the main pipe rail as to ride over the outer circumference of the main pipe rail.

With the construction thus far described, the invention can be easily practiced by the joint structure according to the welding or soldering joint method using the cylindrical sleeve nipple which is projected from a portion of the outer circumference of the main pipe rail. The connected portion can be reduced in size and weight and made compact, and the sleeve nipple can be prevented from going out of position so that the leakage and the steal of dust, as might otherwise be invited by a slackness in the connected portion, can be prevented for a long time thereby to ensure a stable and easy connection. By providing the jointing flange portion at the base end of the cylindrical sleeve nipple and by connecting the base end of the cylindrical sleeve nipple to the main pipe rail while riding over the outer circumference of the main pipe rail in the vicinity of the pressure receiving seat, moreover, the joint area between the base end and the outer circumference of the main pipe rail can be increased to improve the joint strength. When the soldering method is adopted, not only the individual sleeve nipples but also the brackets and the seal portions at the main pipe rail ends can be jointed as a whole. When the branch connector is to be removed, too, the cylindrical sleeve nipple can be prevented from moving axially or circumferentially thereby to completely prevent the steal of the dust from the outer circumference of the main pipe rail into the sleeve nipple.

DETAILED DESCRIPTION OF THE PREFERRED EMBODIMENTS

Figure 1:
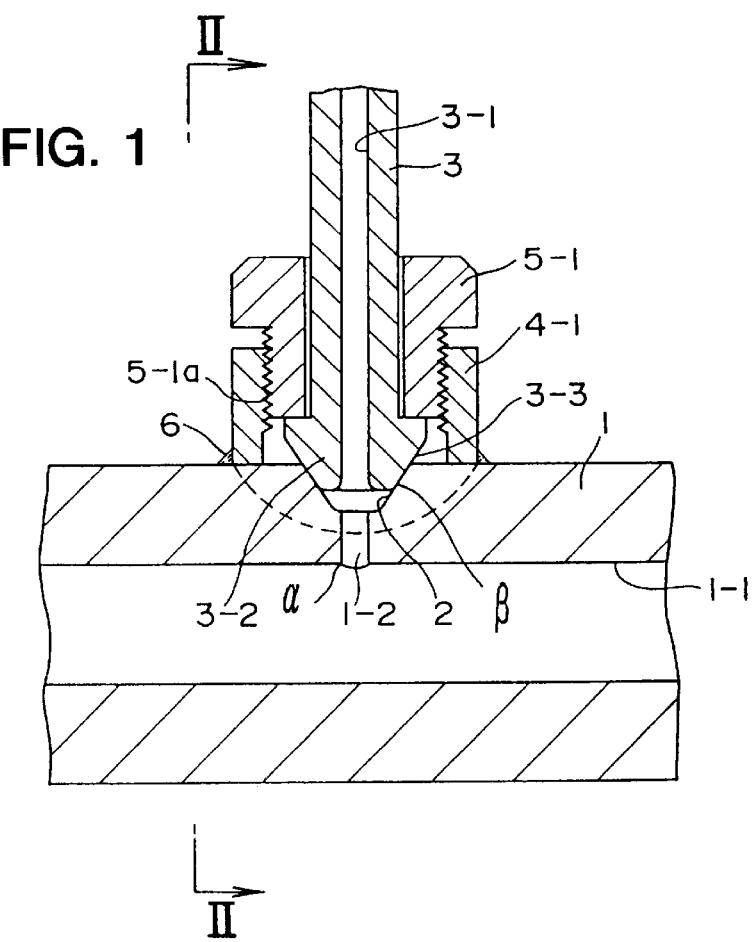
FIG. 1 is an enlarged section of a joint portion and shows a joint structure for a branch connector in a common rail in accordance with a first embodiment of the invention.

The invention will be described with reference to FIGS. 1 to 6. Reference numeral 1 designates a main pipe rail as the common rail; numeral 2 designates a pressure receiving seat; numeral 3 designates a branch connector; numerals 4-1, 4-1a and 4-1b designate internally threaded sleeve nipples; numeral 4-2 designates an externally threaded sleeve nipple; numerals 5-1 and 5-2 designate a male nut and a cap nut, respectively; and numeral 6 designates a welded overlay or a solder fillet.

The main pipe rail 1 as the common rail is made of a relatively thick and slender metal pipe having a diameter of about 20 mm and a thickness of about 6 mm, for example. This main pipe rail 1 has a conduit 1-1 therein on its axis and a plurality of through holes 1-2 which are formed in its circumferential wall at an axial spacing, and each of which is opened to the outside to form the pressure receiving face 2 on its circumference and communicating with the conduit 101.

On the other hand, the branch connector 3 is made of a branch pipe or a branch fitting and has therein a conduit 3-1 to communicate with the conduit 1-1. This branch connector 3 has at its end a tapered joint head 3-2 which is radially expanded by the buckling method to form a pressure seat 3-3.

In the invention, the joint fitting of the branch connector is constructed of either the internally threaded cylindrical sleeve nipple 4-1 having a circular contour of a diameter to enclose the pressure receiving seat 2 or the externally threaded cylindrical sleeve nipple 4-2 having a circular contour. This sleeve nipple 4-1 or 4-2 is welded or soldered so concentrically of the pressure receiving seat 2 to the main pipe rail 1 outside of the pressure receiving seat 2 as to enclose the seat 2.

Figure 2:
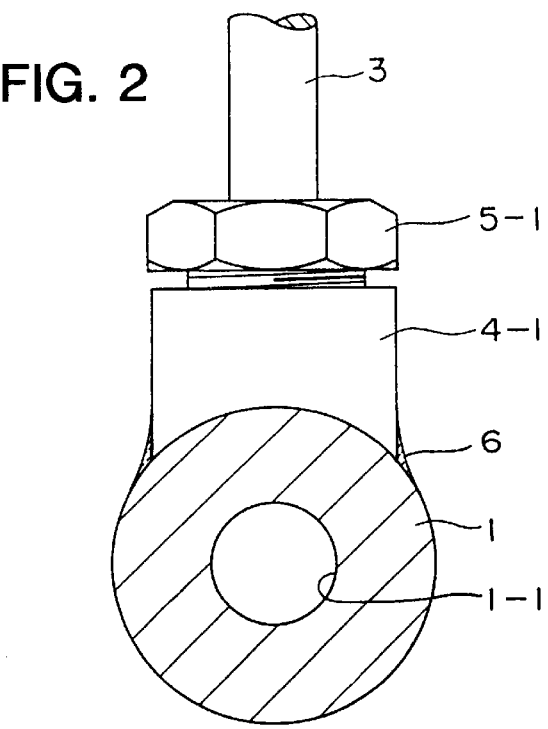
FIG. 2 is a section taken along line II—II of FIG. 1.

Specifically, in the joint structure for a branch connector in the common rail according to a first embodiment of the invention shown in FIGS. 1 and 2, the cylindrical sleeve nipple 4-1 having on its inner circumference a threaded face 5-1a to be screwed on the male nut 5-1 assembled in advance with the branch connector 3 is employed as the joint fitting and is welded or soldered at its base end so concentrically of the pressure receiving face 2 to the outer circumference of the main pipe rail 1 in the vicinity of the pressure receiving face 2 as to enclose the pressure receiving face 2, and the pressure face 3-3 formed by the joint head 3-2 of the branch connector 3 is brought into abutting engagement with the pressure receiving face 2 of the main pipe rail 1, so that the branch connector 3 is jointed to the main pipe rail 1 by fastening the male nut 5-1 into the sleeve nipple 4-1.

Figure 3:
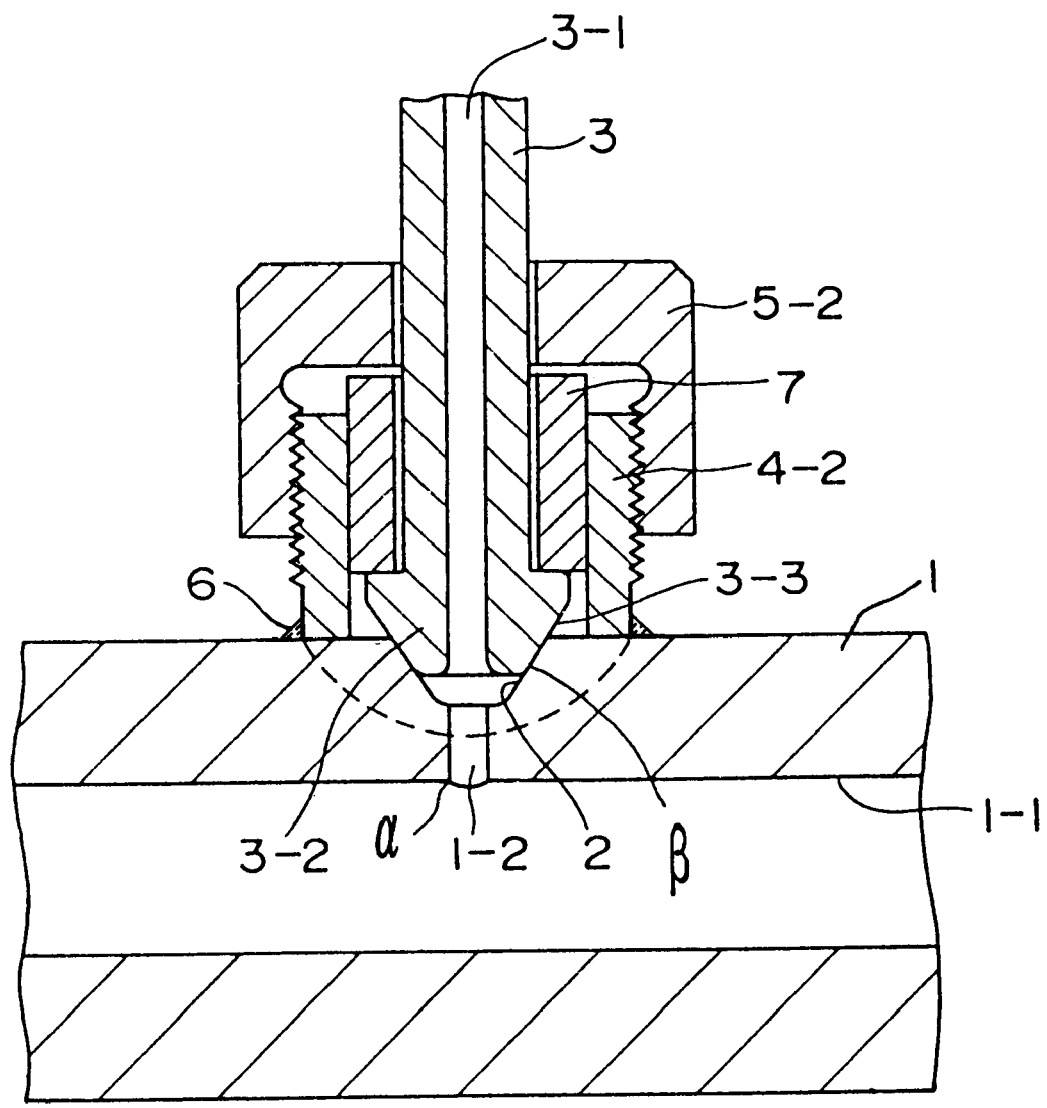
FIG. 3 corresponds to FIG. 1 but shows a second embodiment of the invention.

In the joint structure for a branch connector in the common rail according to a second embodiment of the invention shown in FIG. 3, on the other hand, the joint fitting of the branch connector is exemplified by the externally threaded cylindrical sleeve nipple 4-2 having a diameter to enclose the pressure receiving seat 2 and is welded or soldered, as in the aforementioned internally threaded sleeve nipple 4-1, at its base end so concentrically of the pressure receiving face 2 to the outer circumference of the main pipe rail 1 in the vicinity of the pressure receiving face 2 as to enclose the pressure receiving face 2, and the pressure face 3-3 formed by the joint head 3-2 of the branch connector 3 is brought into abutting engagement with the pressure receiving face 2 of the main pipe rail 1, so that the branch connector 3 is jointed to the main pipe rail 1 by fastening the cap nut 5-2 into the sleeve nipple 4-2. Reference numeral 7 designates a sleeve washer.

In the invention, as described above, the sleeve nipple 4-1 or 4-2 and the main pipe rail 1 are firmly jointed by the welding or soldering method so that the sleeve nipple 4-1 or 4-2 can be prevented from chattering and axially or circumferentially moving.

In the invention, moreover, both the internally threaded cylindrical sleeve nipple 4-1 and the externally threaded cylindrical sleeve nipple 4-2 exemplifying the joint fitting are jointed directly to the main pipe rail 1 by the welding or soldering method. When the welding method is adopted for the joint, the connected portion of the branch connector 3 is troubled by the thermal influences. However, the sleeve nipple 4-1 or 4-2 is welded, as shown, with the welded overlay 6 at the outer circumference of its base end so that no problem arises, because the influence of the welding heat will not extend so far as to the vicinities of a starting position α of the internal pressure fatigue of the conduit 1-1 of the main pipe rail 1 and a seal line position β between the pressure seat 3-3 of the joint head 3-2 of the branch connector 3 and the pressure receiving face 2 of the main pipe rail 1. When the soldering method is adopted, on the other hand, the thermal influence extends to the vicinities of the starting point α of the internal pressure fatigue and the seal line position β. In this case, however, a material less reluctant to receive the thermal influence may be selected for the main pipe rail 1 or the sleeve nipple 4-1 or 4-2. If the soldering method is adopted, moreover, the sleeve nipple can be jointed as a whole to the main pipe rail so that another effect of making the main pipe rail easily can be achieved.

Figure 4A:
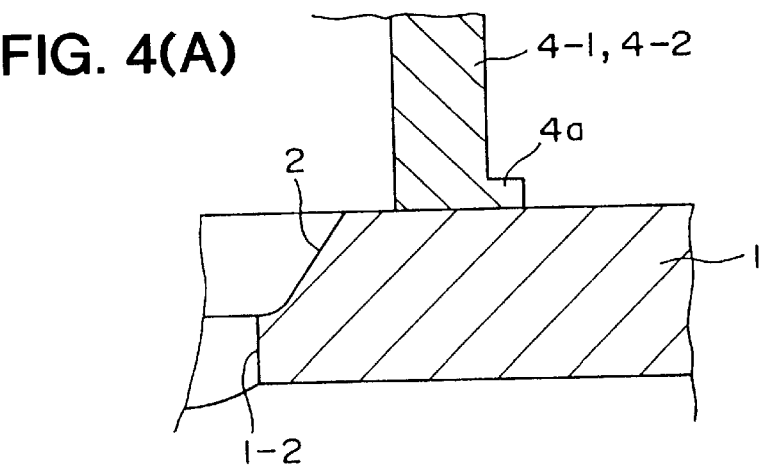
FIGS. 4A and 4B are partial sections showing examples of the structure of the base end of a sleeve nipple in accordance with a third embodiment of the invention, and respectively present an example, in which a flange having a small width is formed at the base end of the sleeve nipple, and an example in which a flange having a large width is formed at the base end of the sleeve nipple.
Figure 4B:
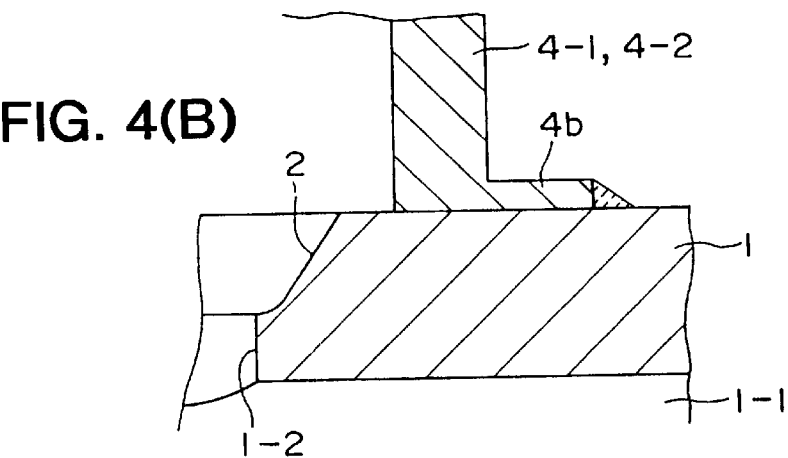

In a third embodiment of the invention, as shown in FIGS. 4A and 4B, the internally threaded sleeve nipple 4-1 or the externally threaded cylindrical sleeve nipple 4-2 is modified at its base end structure to improve the strength by increasing the joint area between the base end and the outer circumference of the main pipe rail 1. When the welding method is adopted for the aforementioned joint, the problem of the thermal influence can be further taken into consideration. The means for avoiding the influence of the thermal heat more perfectly is exemplified, in FIG. 4A, by a structure in which a welding flange 4a having a small width to be melted away at the welding time is formed at the base end of the sleeve nipple 4-1 or 4-2 or, in FIG. 4B, by a construction in which a welding flange 4b having a large width is formed at the base end of the sleeve nipple 4-1 or 4-2. By forming the welding flange 4a or 4b at the base end of the sleeve nipple 4-1 or 4-2, more specifically, the distance to the welding portion from the starting position α of the internal pressure fatigue or from the seal line position β of the seat face is elongated so that the influence of the welding heat can be avoided more perfectly than in the sleeve nipple having no welding flange. When the soldering method is adopted for the joint, on the other hand, its operation can be more facilitated by the soldering flange portion 4a having a small width or the soldering flange portion 4b having a large width, and the soldering strength can also be improved.

Figure 5:
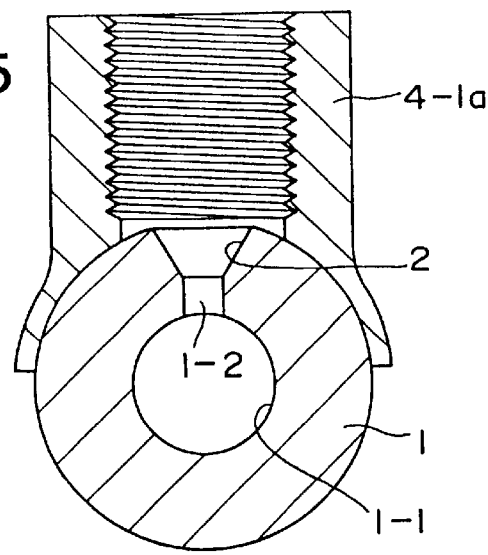
FIG. 5 is a section showing a structure of the base end of the sleeve nipple in accordance with a fourth embodiment of the invention.

In a fourth embodiment of the invention, as shown in FIG. 5, the construction of the base end of the internally threaded cylindrical sleeve nipple 4-1a is made such that the base end rides over the main pipe rail 1. In case of this structure, as with the flanged sleeve nipple shown in FIG. 4, it is also possible to avoid the influence of the welding head, to facilitate the soldering operation and to enhance the soldering strength. This structure can naturally be applied to the case in which the cylindrical sleeve nipple 4- 4-1a is externally threaded.

Figure 6A:
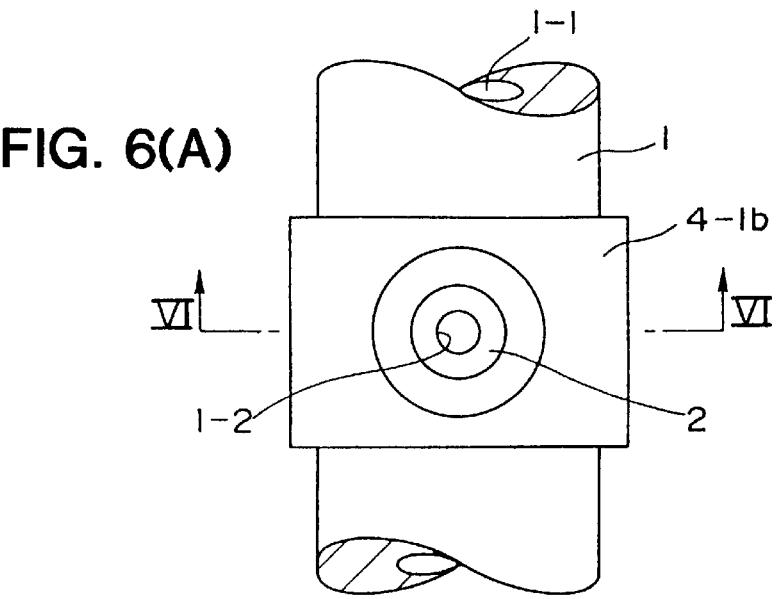
FIGS. 6A and 6B show an example of the joint structure of another sleeve nipple of the invention, and respectively present a top plan view of a sleeve nipple joint portion and a section taken along line VI-VI of FIG. 6A.
Figure 6B:
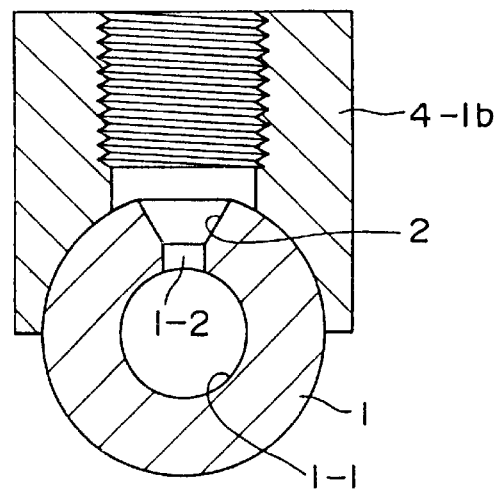
Figure 7:
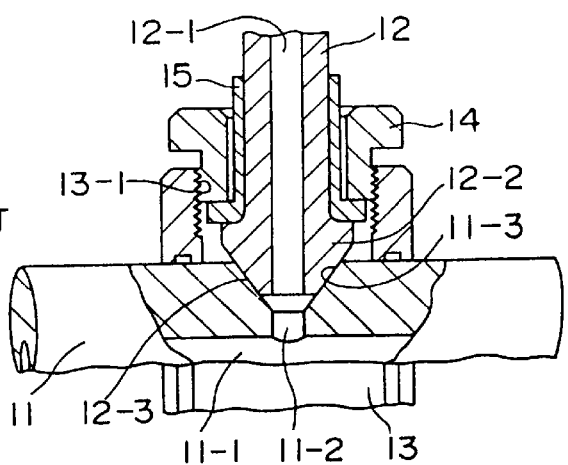
FIG. 7 is a partially cut-away enlarged section showing the joint structure of the prior art for a branch connector in the common rail.

Here, the foregoing embodiments shown in FIGS. 1 to 5 have been exemplified by the sleeve nipples having circular contours. However, the internally threaded cylindrical sleeve nipple should not limit its contour to the circular shape but may be replaced by the sleeve nipple 4-1b having a rectangular contour, as shown in FIGS. 6A and 6. This rectangular sleeve nipple 4-1b can naturally achieve effects similar to those of the circular one.

In a joint structure for a branch connector in a common rail in accordance with the invention, as has been described hereinbefore, the joint fitting of the branch connector is replaced by the cylindrical sleeve nipple, and this sleeve nipple is projected from a portion of the outer circumference of the main pipe rail by using the welding or soldering joint structure, so that the joint connector is connected to the main pipe rail by screwing and fastening the male nut, as assembled in advance with the branch connector, into the sleeve nipple. The connected portion can be reduced in size and weight and made compact, and the sleeve nipple can be prevented from going out of position so that the leakage and the steal of dust, as might otherwise be invited by a slackness in the connected portion, can be prevented for a long time thereby to ensure a stable and easy connection. Thus, it is possible to provide a remarkably useful joint structure for a branch connector in a common rail.

I claim:

1. A joint structure for a branch connector in a common rail, comprising:

a main pipe rail having a circumferential wall with inner and outer circumferential surfaces generated about an axis, said inner circumferential surface defining a conduit therein, a plurality of through holes formed transversely through the circumferential wall at an axial spacing, each of said through holes having a circumferential face, an outwardly flared pressure receiving seat formed on portions of the circumferential face adjacent the outer circumferential surface of said circumferential wall of said main pipe rail;

a branch connector having a conduit to communicate with the conduit of said main pipe rail, the branch connector having an end, an enlarged joint head formed at the end thereof and forming a shoulder facing away from said end and a tapered pressure seat disposed in abutment against the pressure receiving seat of said main pipe rail;

a nut surrounding portions of said branch connector, said nut having an array of threads and having a portion for pressing the shoulder of said joint head; and a sleeve nipple having a cylindrically generated base end surface extending through an arc of no more than 180° and disposed in face-to-face engagement with portions of said outer circumferential surface of said main pipe rail surrounding and spaced from said pressure receiving seat, outer portions of said sleeve nipple at said base end surface being jointed to said outer circumferential surface of said main pipe rail, said sleeve nipple including a bore extending therethrough in alignment with said pressure receiving seat, said sleeve nipple further having a threaded face concentric with said bore so that said pressure seat of said branch connector is engaged against the pressure receiving seat of said main pipe rail by tightening the threads of the nut with the threaded face of said sleeve nipple.

2. A joint structure for a branch connector in a common rail according to claim 1, wherein said nut is a male nut and wherein the threaded face of the sleeve nipple is disposed in said bore thereof.

3. A joint structure for a branch connector in a common rail according to claim 1, wherein said nut is a cap nut and wherein the threaded face of said sleeve nipple comprises an array of external threads.

4. A joint structure for a branch connector in a common rail according to claim 1, wherein the base end face of said sleeve nipple and the outer circumference of said main pipe rail are jointed by welding or soldering.

5. A joint structure for a branch connector in a common rail according to claim 1, wherein said sleeve nipple has a jointing flange extending outwardly at its base end surface.

6. A joint structure for a branch connector in a common rail according to claim 1, further comprising a welded overlay at outer most portions of said sleeve nipple fitting adjacent said base end surface thereof and adjacent said main pipe rail for securely jointing said sleeve nipple to said main pipe rail.

7. A joint structure for a branch connector in a common rail according to claim 1, further comprising a solder fillet at outer most portions of said sleeve nipple adjacent said base end surface thereof and adjacent said main pipe rail for securely jointing said sleeve nipple to said main pipe rail.

8. A joint structure for a branch connector in a common rail according to claim 1, wherein said main pipe rail has an outside diameter of approximately 20 mm and a wall thickness of approximately 6 mm.

9. A joint structure for a branch connector in a common rail according to claim 1, wherein said joint head of said branch connector defines a major outside diameter substantially adjacent said shoulder thereof, said bore of said joint fitting defining an inside diameter greater than said outside diameter of said joint head.

10. A joint structure for a branch connector in a comment rail according to claim 1, wherein said base end surface of said sleeve nipple is configured for positioning said jointing between said sleeve nipple and said main pipe rail sufficiently from said pressure receiving seat to avoid thermal influences on said pressure receiving seat of said main pipe rail due to heat generated during jointing.

* * * * *